A. H. KAUFMANN.
CULVERT.
APPLICATION FILED JULY 6, 1910.
988,109.
Patented Mar. 28, 1911.
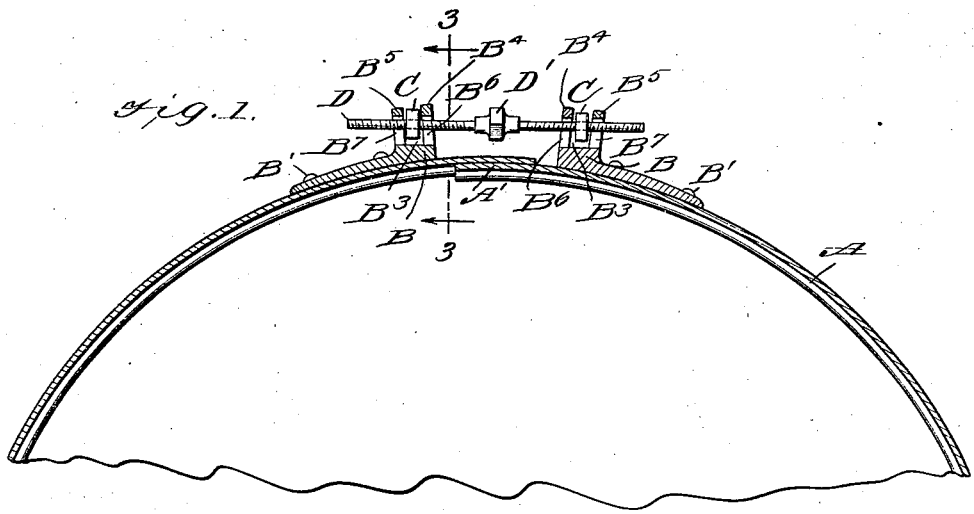
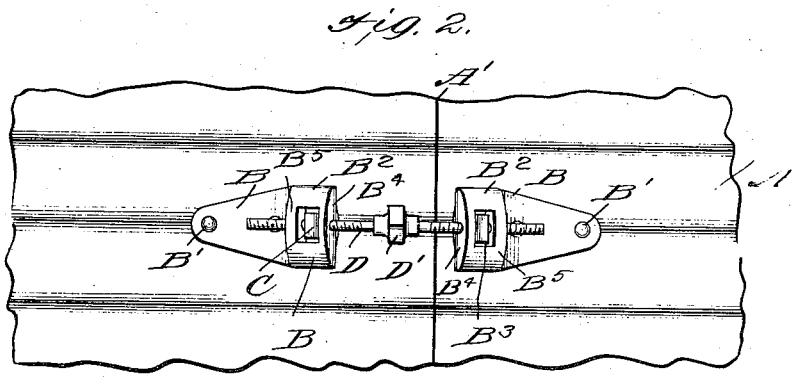
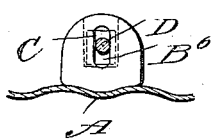
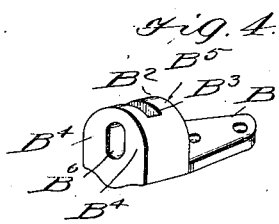
WITNESSES:
INVENTOR
ADOLPH H. KAUFMANN
BY
ATTORNEYS ptinstant # UNITED STATES PATENT OFFICE.

ADOLPH HENRY KAUFMANN, OF GUTHRIE, OKLAHOMA.

CULVERT.

988,109.  Specification of Letters Patent.  Patented Mar. 28, 1911.

Application filed July 6, 1910. Serial No. 570,544.

*To all whom it may concern:*

Be it known that I, ADOLPH H. KAUFMANN, a citizen of the United States, and a resident of Guthrie, in the county of Logan and State of Oklahoma, have invented certain new and useful Improvements in Culverts, of which the following is a specification.

This invention is an improvement in corrugated sheet metal culverts and relates particularly to the means for spreading and contracting the same so they may be conveniently joined together and may be shipped in sections; and the invention consists in certain novel constructions and combinations of parts as will be hereinafter described and claimed.

In the drawing Figure 1 is a cross section and Fig. 2 is a top plan view, partly broken away, of a culvert provided with my improvements. Fig. 3 is a cross section on about line 3—3 of Fig. 1. Fig. 4 is a detail perspective view of one of the recessed blocks.

By my invention, I provide for spreading the split end of a corrugated culvert section so a meeting section may be fitted in such end of the split section and the latter may then be contracted upon the meeting section and in doing this, I provide the corrugated section A on opposite sides of its lapped joint A' with recessed blocks B riveted or otherwise secured at B' to the culvert section and having their body portions B² provided with recesses B³ open at their outer ends and formed to receive nuts C, the recesses B³ being angular so the nuts when fitted therein will be held from turning. The opposite walls B⁴ and B⁵ of the recesses B³ are provided with slots B⁶ and B⁷ for the passage of the screw D which has its ends threaded, one right and the other left and engaged with the corresponding nuts C so the turning of the screw D by its head D' will operate to draw the recessed blocks toward each other or to force them apart according to the direction in which the screw D is turned. The slots B⁷ permit the extension of the screw D beyond the body portion of the recessed blocks, while the outer walls of the slots are closed and prevent any displacement of the screw, and the form of the recesses B³, as before described, operates to prevent the nuts from turning so the screw may be manipulated to contract or expand the culvert section as desired.

I claim:

1. The combination of a split culvert section, blocks on opposite sides of the joint thereof and having body portions recessed in their outer sides and having said recesses non-circular and having the inner and outer walls of the recesses provided with slots for the passage of an operating screw, nuts fitting in said recesses and conforming thereto whereby they are held from turning and having their threaded openings in alinement with the inner and outer slots in the walls of the recesses and a right and left screw having a central head portion and having the laterally extending threaded portions operating in their respective nuts and extending through the slots in the inner and outer walls of the recesses receiving said nuts, substantially as set forth.

2. The combination with the recessed blocks having the inner and outer walls of their recesses slotted for the passage of the operating screw, nuts fitting and held from turning in the recesses of the blocks and an operating screw having right and left threads operating in their respective nuts, substantially as set forth.

3. The combination of a culvert section having a longitudinal joint, blocks on opposite sides thereof and provided in their outer sides with recesses and nuts fitting loosely therein and held from turning, the inner and outer walls of said recesses being slotted and a right and left screw having its threaded portions turning in the nuts and extending through the slots in the inner and outer walls of the nut receiving recesses, substantially as set forth.

ADOLPH HENRY KAUFMANN.

Witnesses:
 JOHN D. CHAPPELLE,
 MABEL L. GLOVER.